Patented June 19, 1945

2,378,435

UNITED STATES PATENT OFFICE 2,378,435

CHEMICAL COMPOUNDS

William L. Ruigh, Princeton, N. J., assignor to E. R. Squibb & Sons, New York, N. Y., a corporation of New York No Drawing. Application August 13, 1942,
Serial No. 454,727

1 Claim. (Cl. 260—397.2)

This invention relates to, and has for its object the provision of: (I) 7-dehydrocampesterol and its antirachitic activation product; (II) intermediates utilizable in the preparation of these products; and (III) a method of preparing these intermediates (II) and products (I).

Campesterol is a phytosterol recently isolated from soy-bean oil [Fernholz and MacPhillamy, J. A. C. S. 63, 1155 (1941)], and shown to have the structural formula

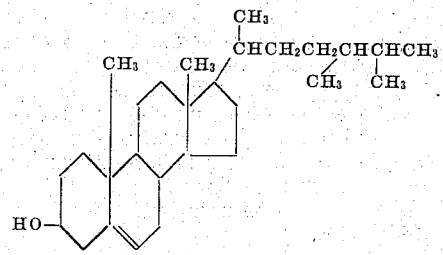

[Fernholz and Ruigh, J. A. C. S. 63, 1157 (1941)]. It has now been found that an antirachitic agent may be obtained by converting campesterol into 7-hydroxy-campesterol, converting the latter into 7-dehydro-campesterol, and antirachitically-activating the 7-dehydro-campesterol. This was unexpected, inasmuch as irradiated 7-dehydro-stigmasterol (similarly-obtained from a closely-related sterol) is practically devoid of vitamin D activity [Haslewood, Biochem. J., 33, 454 (1939)].

The 7-hydroxy-campesterol may be obtained directly by oxygenating a stabilized aqueous colloidal solution of campesterol (in the manner described in Wintersteiner application Serial No. 425,418, filed January 2, 1942). Desirably, however, it is obtained by esterifying campesterol to obtain a campesteryl ester (preferably campesteryl acetate), oxidizing the ester to obtain the corresponding 7-keto compound (which is also obtainable, in the form of free 7-keto-campesterol, by the aforementioned oxygenation of campesterol in aqueous colloidal solution), and converting the keto compound into 7-hydroxy-campesterol by mild reduction (and hydrolysis).

The conversion of 7-hydroxy-campesterol into 7-dehydro-campesterol may be effected by "dehydration" methods well known in the art (e. g., the methods disclosed in U. S. Patents 2,098,984 and 2,209,934). Preferably, the 7-hydroxy-campesterol is esterified, and the resulting di-ester is converted into 7-dehydro-campesterol in the manner disclosed in Wintersteiner and Ruigh application Serial No. 421,040, filed November 29, 1941, i. e., by treating the di-ester with a hydrolyzing agent under mild reaction conditions, and subjecting the thus-obtained 7-acyloxy-campesterol to thermal decomposition, either alone or in the presence of a high-boiling amine, to obtain 7-dehydro-campesterol.

7-dehydro-campesterol is a provitamin D, and can be readily activated by ultraviolet light, or other physicochemical means, to provide an antirachitic agent.

The following example is illustrative of the invention:

(a) *Preparation of 7-keto-campesteryl acetate*

44 g. campesteryl acetate (obtainable by acetylating campesterol, as described in the Fernholz and MacPhillamy article referred to hereinbefore) is dissolved in 750 cc. hot glacial acetic acid and, after cooling to 55° C., is gradually treated within two hours with a solution of 32 g. chromic acid anhydride in 50 cc. 50% acetic acid, and the solution is kept at a temperature of 55° C. for 9 hours. The reaction mixture is then concentrated under reduced pressure, diluted with water, and extracted with ether; and the ether extract is washed with dilute caustic soda solution (to remove remaining acid), dried with anhydrous sodium sulfate, and concentrated to small volume. The residue is diluted with methanol, heated to boiling (to remove remaining ether), and, while hot, treated with water until turbidity commences. On cooling, 14 g. of a crude 7-keto-campesteryl acetate (melting at 168–70° C.) crystallizes out; which may be used directly for the following conversion, or may be purified by repeated recrystallization from alcohol, yielding 7.4 g. pure 7-keto-campesteryl acetate as needles melting at 177–178° C. and having a rotation of $[\alpha]_D^{24}$—88.6° (1.18% in chloroform).

(b) *Preparation of 7-hydroxy-campesterol*

7 g. 7-keto-campesteryl acetate is dissolved in 120 cc. isopropyl alcohol, 7 g. liquefied aluminum isopropylate is added, and the mixture is boiled for 16 hours under reflux. The reaction mixture is then diluted with ether, and aluminum and isopropyl alcohol are removed therefrom by washing with dilute hydrochloric acid; and the ether extract is dried and evaporated, and the residue digested with a small quantity of petroleum ether. By filtration, 4.7 g. crude 7-hydroxy-campesterol is obtained, which can be used directly for the following conversion.

(c) Preparation of 7(α)-benzoxy-campesteryl benzoate 4.7 g. crude 7-hydroxy-campesterol is dissolved in 35 cc. pyridine, 12 cc. benzoyl chloride is added, and the mixture is allowed to stand overnight. The reaction mixture is then diluted with ether, and extracted successively with dilute hydrochloric acid, sodium carbonate solution, and water. The ether extract is then dried and concentrated to small volume, and methanol is added until turbidity occurs. After standing for a long time, 3.8 g. of crude 7(α)-benzoxy-campesteryl benzoate (melting at 171–172° C.) separates, and may be used directly for the following conversion; and by repeated recrystallization from acetone, the compound may be obtained as needles, melting at 176.5–177.5° C., and having a rotation of $[\alpha]_D^{23}+96.6°$ (0.81% in chloroform).

(d) Preparation of 7(α)-benzoxy-campesterol 2 g. 7(α)-benzoxy-campesteryl benzoate is dissolved in 40 cc. benzene, and a solution of 1.33 g. sodium methylate in 66 cc. dry methanol is added. The mixture is allowed to stand at room temperature for 16 hours, and is then poured onto cracked ice; and the benzene layer is separated, washed in succession with dilute hydrochloric acid, water, and dilute sodium carbonate solution, and dried with sodium sulfate. On evaporating off most of the benzene and adding hexane, 7(α)-benzoxy-campesterol separates as a solid product, which may be used directly for the following conversion. On purification by chromatographing on alumina and crystallizing from a mixture of benzene and hexane, 1.3 g. of filamentous needles is obtained, melting at 143–145° C. (after sintering to a glassy solid at 126–130° C.) and having a rotation of $[\alpha]_D^{26}+115.0°$ (1.16% in chloroform).

(e) Preparation of 7-dehydro-campesteryl benzoate 1 g. 7(α)-benzoxy-campesterol is refluxed for three hours in 25 cc. dimethylaniline under an atmosphere of nitrogen. The cooled reaction mixture is acidified with HCl, and extracted with ether; and the ether extract is washed with successive portions of dilute hydrochloric acid, water, and sodium carbonate. The ether is then removed by evaporation, and the residue taken up in a small quantity of 90% ethanol; and an excess of a 1% solution of digitonin in 95% ethanol added thereto. The precipitate (of 7-dehydro-campesterol digitonide), on decomposition with pyridine ether, yields 564 mg. of impure 7-dehydro-campesterol, which may be directly activated to form an antirachitic agent. On crystallization from acetone, 475 mg. is obtained as leaflets melting at 148–149.5° C. (the melting point being taken in a sealed evacuated tube after drying for a half hour under a high vacuum at 107° C.) and having a rotation of $[\alpha]_D^{23}-91.0°$.

The thus-obtained impure 7-dehydro-campesterol (475 mg.) is dissolved in 10 cc. pyridine, 1 cc. benzoyl chloride is added, and the mixture is allowed to stand for several hours at room temperature and then for a day at about 4° C.; and the reaction mixture is worked up as described in (c) above. After four recrystallizations from a mixture of benzene and alcohol (1:4), 229 mg. 7-dehydro-campesteryl benzoate is obtained in the form of fine needles melting at 156–157° C. (to a cloudy liquid which clears sharply at 164° C.). The compound gives positive Tortelli-Jaffe and Rosenheim trichloracetic acid reactions, and has a rotation of $[\alpha]_D^{23}-50.2°$ (1.0% in chloroform).

(f) Preparation of 7-dehydro-campesterol

A solution of 150 mg. 7-dehydro-campesteryl benzoate in 5 cc. benzene is added to 10 cc. of a 5% solution of potassium hydroxide in methanol. After boiling for two hours, extracting with ether, removing the ether from the extract, and crystallizing from a mixture of acetone and methanol, 7-dehydro-campesterol is obtained as shining irregular plates melting at 164–5° C. and having a rotation of $[\alpha]_D^{25}-109.0°$ (0.96% in chloroform)—the sample for analysis being dried for 2½ hours at 107° C. in a high vacuum.

(g) Activation of 7-dehydro-campesterol

The 7-dehydro-campesterol is dissolved in peroxide-free ether to form a 0.1% solution, and dissolved air is displaced by passing a stream of carbon dioxide therethrough. 63 cc. of this solution is irradiated for four minutes with a preheated 125-watt, air-cooled quartz mercury-vapor lamp, and the irradiated solution is evaporated to dryness; and the residue (a resinous material) is dissolved in a few drops of alcohol and made up to 6.3 cc. with corn oil, for assay. The thus-activated 7-dehydro-campesterol, assayed by the U. S. P. XI line test on rats, has an activity of 725,000 international units of vitamin D per gram of the original 7-dehydro-campesterol. Since the irradiation of ergosterol under the same conditions gives a conversion of 17.5%, the antirachitic potency of the vitamin derived from 7-dehydro-campesterol is estimated as 4,100,000 international units per gram. The fact that activated 7-dehydro-campesterol is relatively less active when assayed by the chick test indicates that the vitamin resembles vitamin $D_2$ rather than vitamin $D_3$.

Manifestly, crude or partially purified plant sterols rich in campesterol may be used in place of campesterol per se in the practice of this invention.

Esters of campesterol other than the acetate (inter alia the propionate, benzoate, and nitrobenzoate) may be used in (a) of the foregoing example, and the corresponding 7-keto-campesteryl ester used in (b); the chromic acid anhydride used in (2) may be replaced by any other agent which converts a methylene group in α-position to a carbon-carbon double bond into a carbonyl group (e. g., molecular oxygen may be used in the manner described in Wintersteiner application Serial No. 425,418, filed January 2, 1942); and any solvent or mixture of solvents for the reactants may be used in place of glacial acetic acid.

The aluminum isopropylate used in (b) of the foregoing example may be replaced by other mild reducing agents, preferably metal alcoholates (inter alia, aluminum methylate, aluminum ethylate, aluminum propylate, earth-metal alcoholates, and magnesium alcoholate); and the alcohols corresponding to the alcoholates may be used as diluents.

Other di-esters of 7-hydroxy-campesterol—inter alia, the di-acetate, di-(substituted benzoic acid) esters, di-(phenyl-acetate), di-cinnamate, and other di-(lower fatty acid) esters—may be prepared in place of the di-benzoate in (c) of the foregoing example, using the appropriate acylating agent; other solvents (preferably organic bases, inter alia, aniline, and triethylamine) may be used in place of the pyridine; and these other campesterol di-esters may be used in conversion (d) in place of the dibenzoate.

The selective hydrolysis in (d) of the foregoing example may be effected with alkaline hydrolyzing agents other than sodium methylate (inter alia, other alkali-metal alcoholates, alkali hydroxides, and alkali carbonates, in suitable solvents), the reactants being in low concentration and/or the temperature being low (i. e., room or slightly elevated).

The thermal decomposition in (e) of the foregoing example may also be effected by heating the 7($\alpha$)-benzoxy-campesterol to a temperature of the order of 165–185° C. under a vacuum of 2 mm. mercury or less, or by refluxing the compound with other high-boiling organic amines (inter alia, diethyl-aniline and diethyl-amino-cyclo-hexylamine).

The intermediates formed in the foregoing example are useful for the preparation of products other than antirachitically-activated 7-dehydro-campesterol; thus, the 7-acyloxy-campesterols are useful for the preparation of other steroid derivatives having the general structure of 7-dehydro-campesterol with a conjugated system of double bonds in ring B, steroid derivatives having a double bond in positions 8,9, 8,14, and 14,15 of the steroid nucleus, and isodehydrosteroids (which, in turn, may serve as intermediates for hormone synthesis).

The invention may be variously otherwise embodied within the scope of the appended claim.

I claim:

7-dehydro-campesterol.

WILLIAM L. RUIGH.